United States Patent [19]

Lundin

[11] 4,327,270
[45] Apr. 27, 1982

[54] SUBMERGED-ARC SPOT WELDING APPARATUS

[75] Inventor: Börje R. Lundin, Laxa, Sweden

[73] Assignee: ESAB Aktiebolag, Sweden

[21] Appl. No.: 178,452

[22] Filed: Aug. 15, 1980

Related U.S. Application Data

[63] Continuation of Ser. No. 890,933, Mar. 28, 1978, abandoned.

[30] Foreign Application Priority Data

Mar. 28, 1977 [SE] Sweden .............................. 7703491
May 9, 1977 [SE] Sweden .............................. 7705343

[51] Int. Cl.³ .............................................. B23K 9/18
[52] U.S. Cl. .................................. 219/73.2; 219/73; 219/125.1; 219/127
[58] Field of Search ............... 219/73 R, 73.1, 73.2, 219/124.1, 125.1, 127

[56] References Cited

U.S. PATENT DOCUMENTS

| | | | |
|---|---|---|---|
| 2,293,163 | 8/1942 | Morris | 219/73 |
| 2,367,257 | 1/1945 | Baird | 219/73 X |
| 2,814,719 | 11/1957 | Wilson | 219/127 |
| 3,366,773 | 1/1968 | Edge et al. | 219/127 |
| 3,420,979 | 1/1969 | Gowan | 219/73 X |
| 3,898,415 | 8/1975 | D'Acremont | 219/73 |

FOREIGN PATENT DOCUMENTS

| | | | |
|---|---|---|---|
| 921823 | 12/1954 | Fed. Rep. of Germany | 219/73 |
| 932263 | 9/1955 | Fed. Rep. of Germany | |
| 1131823 | 2/1961 | Fed. Rep. of Germany | 219/125.1 |
| 1081805 | 6/1954 | France | 219/73 |
| 571618 | 8/1945 | United Kingdom | |
| 221875 | 9/1968 | U.S.S.R. | 219/73 |
| 456693 | 2/1975 | U.S.S.R. | 219/127 |

Primary Examiner—J. V. Truhe
Assistant Examiner—Keith E. George
Attorney, Agent, or Firm—Lerner, David, Littenberg & Samuel

[57] ABSTRACT

Submerged-arc spot welding apparatus has a carriage for supporting a welding means which is displaceable along a track disposed above a bed or table supporting the work. The carriage is provided with a pressure mechanism consisting of a pressure cylinder guided for motion in the carriage towards and away from the work, a piston in the cylinder having a piston rod attached to a thrust member which is moved into engagement with the work by the outward stroke of the piston. The corresponding backward thrust acting on the cylinder is taken up by stop means rigidly connected to and extending along the track. A stop on the carriage serves to take up the weight of the cylinder when the drive pressure is shut off.

16 Claims, 6 Drawing Figures

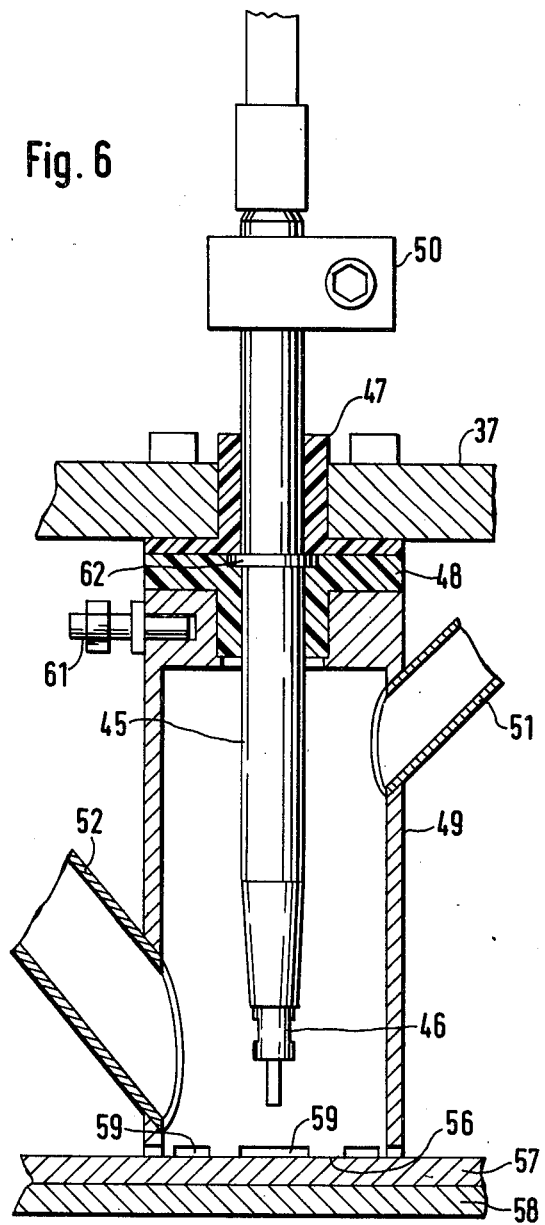

SUBMERGED-ARC SPOT WELDING APPARATUS

This is a continuation, of application Ser. No. 890,933, filed Mar. 28, 1978, now abandoned.

BACKGROUND OF THE INVENTION

1. Field of the Invention

This invention relates to the fabrication of a welded structure, especially a double shiphull bottom, comprising a pair of spaced-apart sheets of heavy sheet steel and a plurality of ribs or stiffeners interposed between and welded to said sheets. In this context, heavy sheet steel means sheet steel the thickness of which is not less than 7 millimeters. Each of the sheets referred to may be a single sheet or a composite sheet consisting of a plurality of single sheets welded together at their adjoining edges. More particularly, the invention relates to the fabrication method which includes the steps of welding one edge of said ribs or stiffeners to one face of a first one of said sheets, the other edge of said ribs or stiffeners being provided with a flange the thickness of which is substantially equal to the thickness of the second of said sheets, applying said second sheet to said ribs or stiffeners and welding it to said flanges by arc welding with a fusible electrode applied from the outside of said second sheet.

2. Description of the Prior Art

A fabrication method of the general kind above specified has been used for the fabrication of flat or substantially flat shiphull bottoms as used in barges, lighters and similar craft. In said known method, the welding of the upper sheet to the flanges of the stiffeners is carried out by the plug welding process. That is to say, the upper sheet is provided beforehand with rows of spaced oblong or circular holes in a configuration corresponding to the one of the underlying stiffeners. In the subsequent plug welding operation, said holes are filled with weld metal to form the plug welds. The extensive piercing operation, which has to be preceded by a careful marking of the hole positions, renders the method time-consuming and expensive.

It is a principal object of the invention to simplify the fabrication method above referred to in order to reduce the cost and time required. Another object of the invention is the provision of improved apparatus for carrying out the method.

SUMMARY OF THE INVENTION

According to a principal feature of the invention, the welding operation in which the second sheet above referred to is welded to the flanges of the ribs or stiffeners is carried out by submerged-arc spot welding. In this method, as in metal-arc spot welding generally, no previous piercing of the top sheet is carried out, the heat supplied by the arc causing the welding pool to penetrate through the top sheet and part of the thickness of the underlying member to be joined to the top sheet.

The improved apparatus according to the invention comprises a substantially horizontal track provided above a bed for supporting a structure, for instance a shiphull bottom, to be welded, a carriage supported and guided by said track, a drive mechanism for adjusting the position of the carriage along the track, and a welding unit supported by said carriage, said welding unit comprising a store of fusible electrode wire, a contact nozzle for the fusible electrode wire, said contact nozzle having a vertical axis, means for advancing the fusible electrode wire from said store and through said contact nozzle, means for electrically connecting a first terminal of a source of welding current to said contact nozzle, means for electrically connecting a second terminal of the source of welding current to the work, a flux container, a tubular flux damming member surrounding and spaced from said contact nozzle, means for conveying welding flux from said container to a flux outlet arranged to discharge the flux into the space surrounded by said damming member, said damming member being vertically displaceable between a lower position in which the damming member engages the work and an upper position providing a clearance between the damming member and the work, and operating means for effecting the vertical displacement of the damming member.

Other objects and features of the invention will appear from the following description of a preferred form thereof, reference being made to the accompanying drawings. Also, features of said preferred form are particularly and distinctly pointed out in the appended claims.

BRIEF DESCRIPTION OF THE DRAWINGS

FIG. 6 is a vertical section, on a greater scale than FIGS. 4 and 5, through the part of the welding unit of FIGS. 4 and 5 which adjoins the work.

Figure 1:
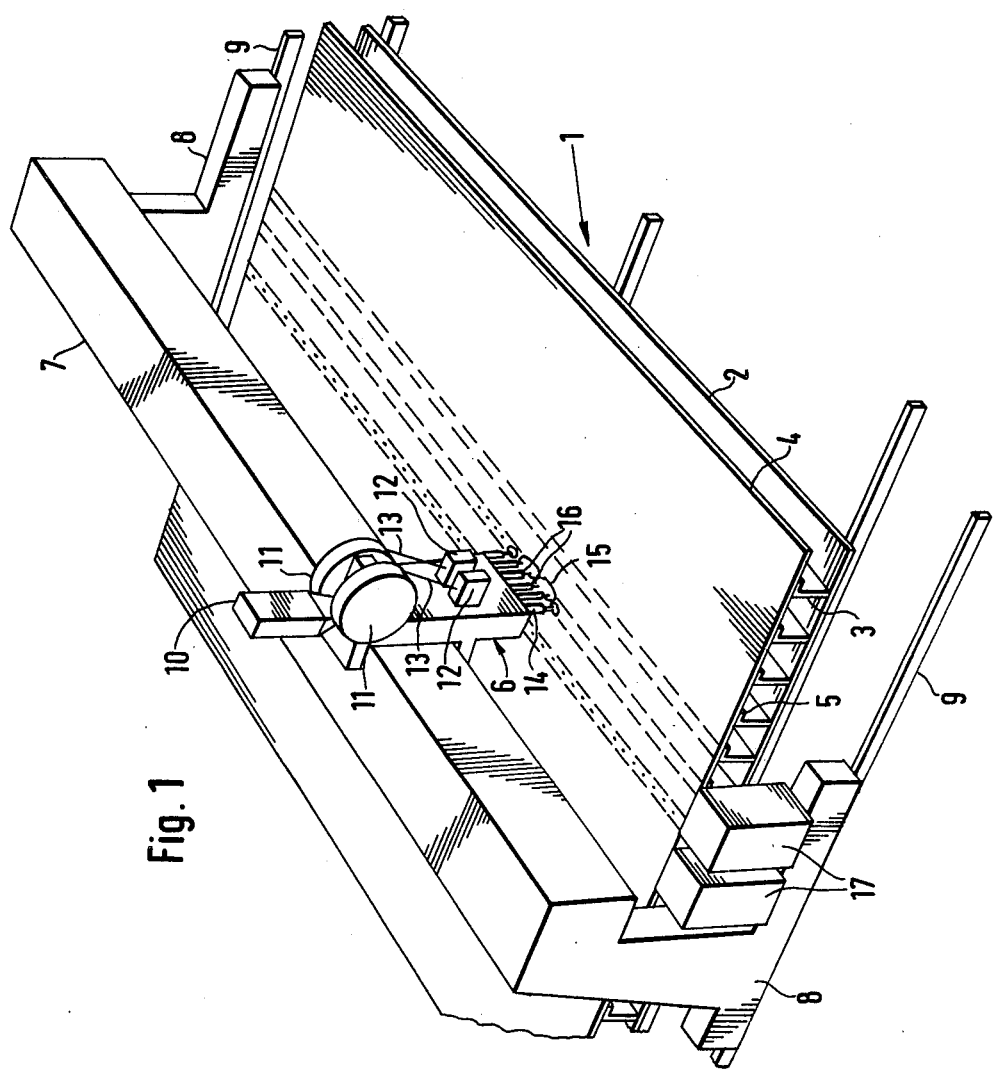
FIG. 1 is a schematical perspective view of a welding plant for fabricating double bottoms for marine vessels.

The double bottom 1 represented as being welded in FIG. 1 comprises a bottom sheet 2, ribs or stiffeners 3 and a top sheet 4. The ribs consist of L-sections the longer shanks of which have been welded to the bottom sheet 2 in a preceding welding station (not shown). The top sheet 4 is deposited on the short shanks, or flanges, of the L-sections in the proper position for welding. The welding unit 6 is supported by a girder 7 extending parallel to the rows of stiffeners 3. The ends of the girder 7 are supported by trolleys 8 displaceable along rails 9 to allow the welding unit to be aligned with the successive rows of stiffeners 3. Moreover, the means for supporting the welding unit 6 on the beam 7 allow displacement of the welding unit along the beam.

The welding unit 6 is arranged to perform submerged-arc spot welding and comprises a flux container 10, a pair of electrode wire reels 11 and a pair of wire advancing mechanisms 12 for the electrode wires 13. A pair of fluid motor operated pushers 14 are arranged to push the top sheet 4 against the flange 5 of the underlying rib. The electrode wires 13 are advanced through a pair of laterally spaced contact nozzles 16 for the simultaneous welding of two spot welds at a time under a layer 15 of welding flux. The welding current is supplied by a pair of welding current sources 17 mounted on one of the trolleys 8. Preferably also a pair of high frequency generators are provided for the initiation of the arc at the starting of each of the spot welding operations.

To minimize the welding stresses in the top sheet, it is preferred to start the spot welding at the middle of the rib 3 and to proceed successively towards the edge of the top sheet 4. If desired, two welding units may be arranged to be displaced along a common beam 7 from the middle of the top sheet towards opposite edges thereof.

Figure 3:
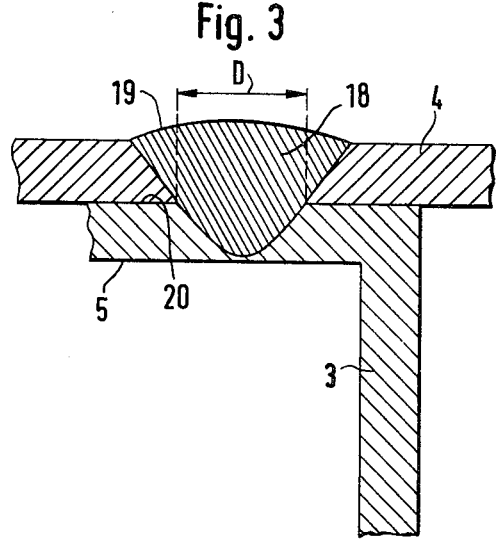
FIG. 3 is a section, on a greater scale than FIGS. 1 and 2, of a spot weld between a top sheet and a flanged stiffener.

As shown in FIG. 3, the spot weld 18 has a substantially conical shape. The welding current and the welding time should be chosen in such a way that the diameter D of the weld in the joint plane amounts to about 2 to 2.5 times the thickness of the flange 5. As a rule, welding currents not less than 1000 amps. should be used, and the quantity of electricity Q (in coulombs) supplied should be within the limits defined by the formula.

$$280.d - 2000 \leq Q \leq 280.d + 1000$$

in which formula d means the total thickness (in millimeters) of the top sheet and the flange 280 is an empirically determined factor in coulombs/millimeters, and the constants 2000 and 1000 are in coulombs. The quantity of electricity is equal to the integral $$\int_o^T$$

idt, in which T is the welding time and i is the welding current. If the welding current is maintained at a constant value I throughout the welding operation, the integral is simplified to I.T. The rule expressed above specifies that for any welding current, the quantity of electricity should not exceed $280.d - 1000$ coulombs and not be lower than $280.d - 2000$ coulombs. The rule has been derived from a large experimental material showing that, while a choice of welding conditions resulting in a quantity of electricity outside the limits specified by said rule may be possible, such operation outside these limits is likely to result in a poor weld. The rule therefore forms a useful aid in determining the proper welding conditions. The surface 19 of the weld should be slightly convex. As no backing is used, care must be taken that the penetration does not quite extend to the bottom face of the flange 5.

Figure 2:
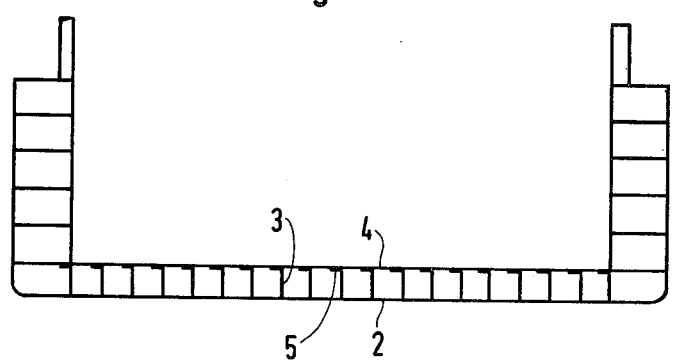
FIG. 2 is a schematical section through a shiphull including a double bottom of the type fabricated in said plant.

FIG. 2 is a section of a barge provided with a bottom fabricated according to the invention. The height of the ribs or stiffeners 3 may be, for instance, 300 or 400 millimeters (12 to 16 in.). This height is too small to conveniently allow the welding of the flange 5 to the top sheet 4 from inside the double bottom.

Figure 4:
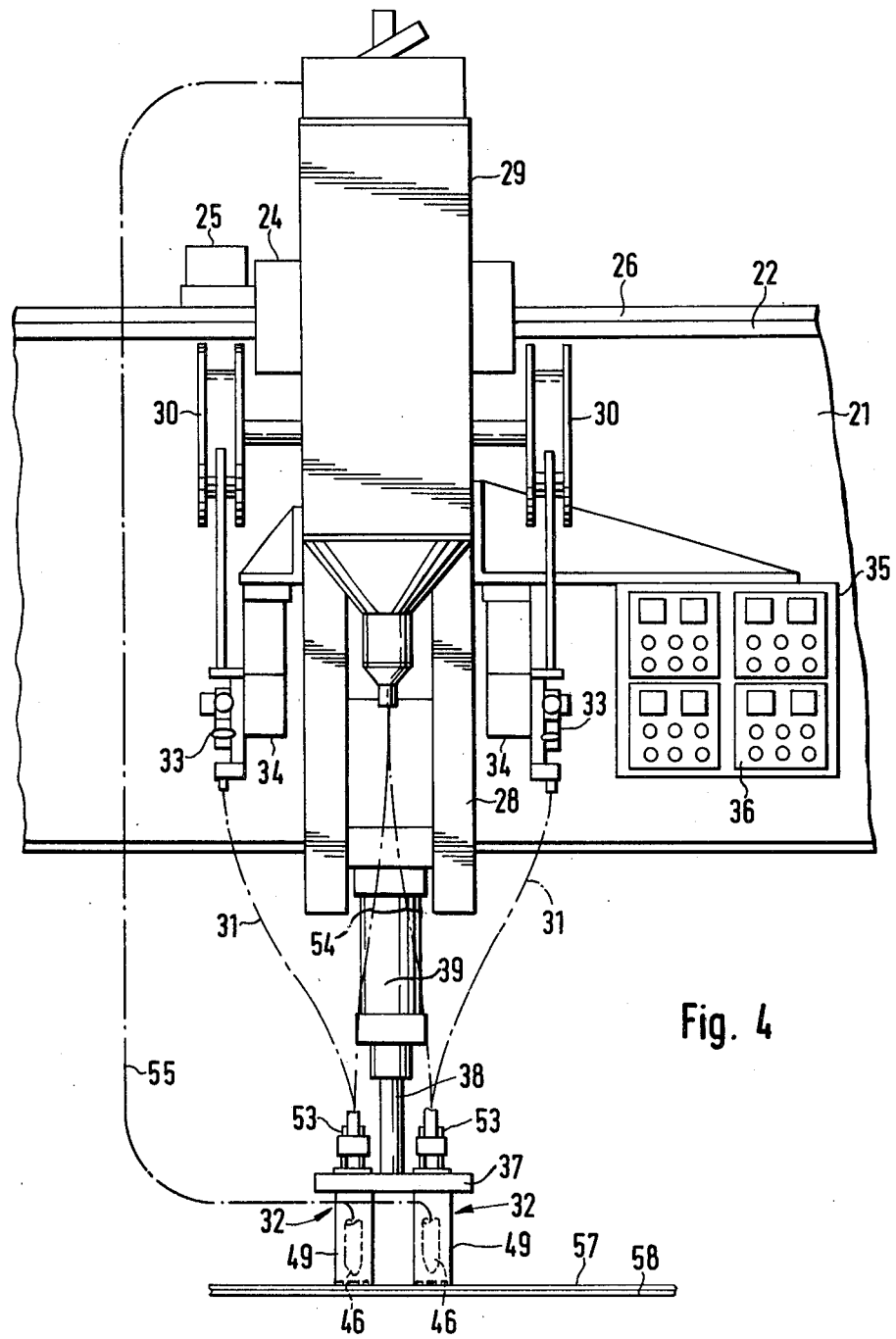
FIG. 4 is a front view of a welding unit according to a preferred embodiment of the invention.
Figure 5:
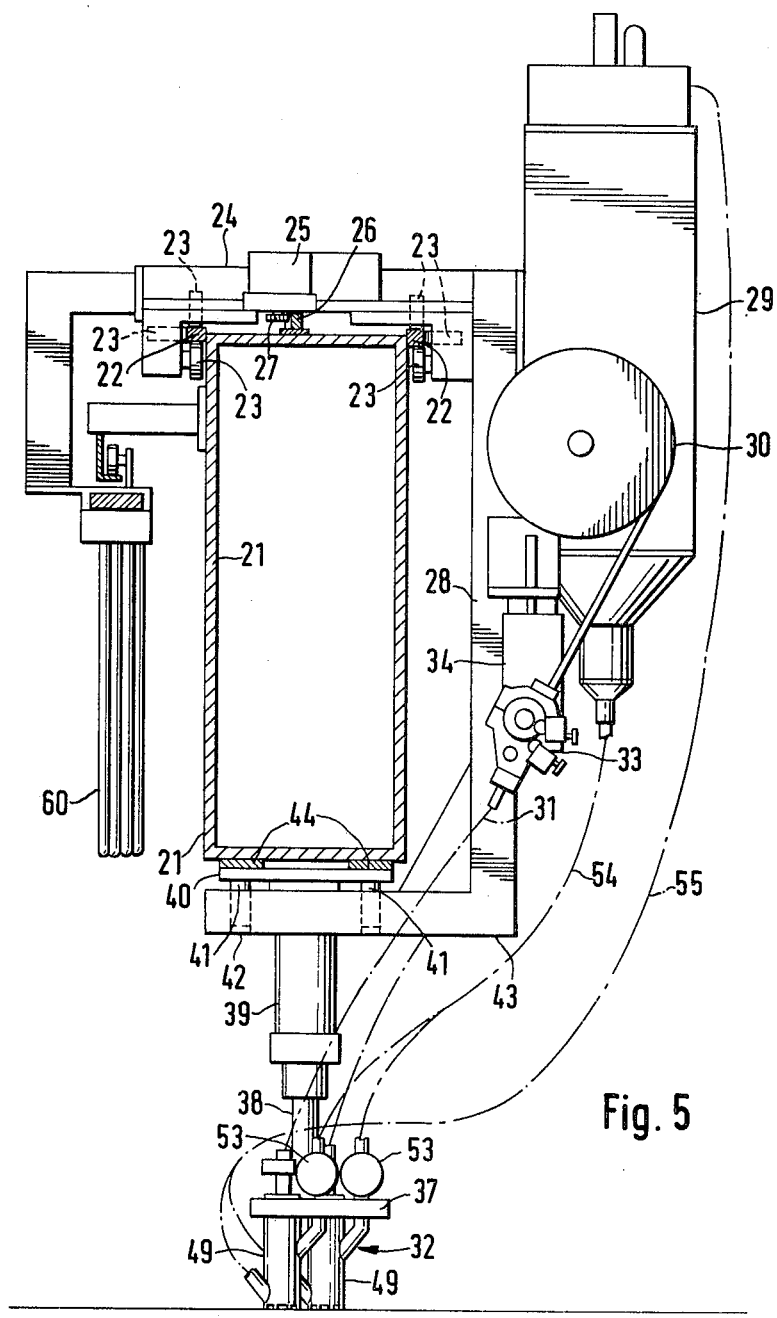
FIG. 5 is a lateral view of the welding unit of FIG. 4.

In the preferred apparatus according to FIGS. 4 to 6, a box girder 21 is fitted with a pair of rails 22 serving to guide and support two sets of rolls 23 of a carriage 24. The carriage is provided with a motor 25 driving through suitable transmission means a pinion 27 engaging a rack 26 fitted on the girder 21. A supporting member 28 forming part of the carriage 23 supports a welding apparatus comprising a flux container 29, a pair of reels 30 for electrode wires 31 and a pair of wire advancing mechanisms 33 each of which is provided with a motor 34 and serves to advance an electrode wire 31 towards a contact nozzle 46 forming part of a welding implement 32. The member 28 also supports a control panel 35 comprising several control units 36.

The welding implements 32 are attached to a plate 37 fitted on the piston rod 38 of a double-acting pressure cylinder 39. Said cylinder is rigidly attached to a vertically movable carrying plate 40 provided with guide projections 41 slidably engaging corresponding bores 42 in a bracket 43 attached to the supporting member 28. The plate 40 is movable between a lower terminal position determined by the bracket 43, which therefore acts as a first stop, and an upper terminal position determined by a pair of abutment members 44, which therefore acts as a second stop, fitted on the underside of the girder 21 and extending along the length of the girder.

The contact nozzles 46 (FIGS. 4 and 6) are each connected to the front extremity of a wire guide tube 45 extending through an electrically insulating bushing 47 fitted in a bore in the plate 37. A flange 62 on the guide tube 45 is clamped between the bushing 47 and a second, electrically insulating bushing 48 supporting a tubular flux damming member 49. The guide tubes 45 are each provided with a contact clamp 50 for connection to a terminal of a welding current source through a welding current cable. Each of the flux damming members 49 is provided with a terminal member 61 for connection to another terminal of the welding current source through another cable. The welding sources (not shown) are assumed to be stationary and connected to the movable welding apparatus by flexible cables 60.

Each of the flux damming members 49 is provided with a pair of lateral pipe connections 51, 52. One pipe connection 51 is connected to a valve or dispenser 53 arranged to control the quantity of flux discharged into the flux damming member 49, said valve or dispenser being connected to the flux container 29 through a conduit 54. The other pipe connection 52 of the tubular damming member 49 is connected through a conduit 55 to a suction device, for instance a compressed-air operated ejector, provided in the upper part of the flux container 29. The lower edge 56 of each of the flux damming members 49 is provided with a plurality of circumferentially spaced, radial grooves or recesses 59 serving to admit air into the damming member when the sucking device is in operation.

The control panel 35 is provided with means for adjusting the parameters of the spot welding process. An adjustable timing device determines the welding time.

When the carriage 24 has been moved into the proper position, pressure fluid is supplied to the cylinder 39 so as to force the piston rod 38 downwards, so that the lower edges of each of the tubular flux damming members are caused to engage the top sheet 57 of the work with a pressure sufficient to provide a satisfactory electric contact between each of the damming members and the work and also to maintain the top sheet 57 in engagement with the flange 58 of the underlying rib whereby each flux damming member 49 acts also as a thrust member. The pressure exerted by the pressure cylinder 39 also moves the cylinder 39 and the plate 40 upwards, whereby the plate 40 is caused to engage the abutments 44 attached to the girder 21, thus ensuring that the piston rod 38 and the welding implements connected therewith are kept immobile during the subsequent welding operation.

First, a quantity of powdered flux determined by the valves 53 is discharged into each of the flux damming members. Next, a high frequency discharge is initiated between each of the electrodes and the work to start the arc, and electrode advancement is switched on. After a predetermined period, electrode advancement is switched off. After a brief additional time, the arc expires. The sucking device is now caused to operate. The current of air required for fluidizing the flux powder contained within the flux damming member and for transporting the powder through the conduits 55 enters the damming member through the recesses 59 in its lower edge. Finally, the fluid pressure supply to the pressure cylinder 39 is reversed, so that the plate 40 is moved downwards out of engagement with the abutment members 44 and into engagement with the bracket 43, whereupon the plate 37 and the members supported thereby, including the flux damming members 49, are raised from the work. The carriage can now be shifted to the next welding position by means of the drive motor 25.

It will be noted that, in the embodiment described, the flux damming members perform important functions in addition to the one of confining the flux to a limited area around the welding spot:

(a) They serve as electrical contact members connecting the work with one terminal of the welding current source.

(b) They serve as pushing members for keeping the top sheet of the work in engagement with the underlying part of the work.

(c) They constitute spacing members defining a predetermined spacing between the contact nozzle and the surface of the work.

(d) They form part of the means for immobilizing the welding apparatus during the welding operation, as they take up the thrust required for the engagement of the steadying plate 40 with the fixed abutment members 44.

In the embodiment described, the lateral spacing of the contact nozzles 46 is fixed. It is, however, equally possible and within the invention to provide means whereby one or both of the contact nozzles are laterally adjustable, so that the spacing of the nozzles can be varied.

I claim:

1. Apparatus for submerged-arc spot welding, comprising a track spaced from support means for supporting a structure to be welded; a carriage supported and guided by said track; drive means for adjusting the position of said carriage along said track; welding means supported by said carriage, said welding means including storage means for storing fusible electrode wire, nozzle means positionable in the vicinity of a structure to be welded for receiving fusible electrode wire, advancing means for advancing fusible electrode wire from said storage means to and through said nozzle means, first connecting means for electrically connecting a source of welding current to said nozzle means, second connecting means for electrically connecting a source of welding current to a structure to be welded, a welding flux container, conveying means for conveying welding flux from said container to a welding zone on a structure to be welded, and a thrust member movable between a first position in which said thrust member engages a structure to be welded and a second position in which said thrust member is spaced a distance from a structure to be welded; motive means for moving said thrust member between said first and second positions, said motive means including a cylinder movable with respect to said carriage towards and away from a structure to be welded and a single piston rod associated with said cylinder, said piston rod being rigidly connected to said thrust member and mounted for reciprocating movement in said cylinder; guiding means for guiding the movement of said cylinder with respect to said carriage; first stop means on said carriage for limiting the movement of said cylinder towards a structure to be welded; and second stop means rigidly connected to said track and extending along said track for limiting the movement of said cylinder away from a structure to be welded when said thrust member is in said first position, said second stop means abutting said cylinder when said thrust member is in said first position and cooperating with said cylinder and said guiding means to completely immobilize said welding means during a submerged-arc spot welding operation carried out when said thrust member is in said first position.

2. Apparatus according to claim 1, wherein said motive means is a fluid pressure motor.

3. Apparatus according to claim 1, wherein said nozzle means is rigidly connected to said thrust member.

4. Apparatus according to claim 1, further comprising insulating means for electrically insulating said thrust member from said nozzle means, said second connecting means including said thrust member, whereby said thrust member, in said first position, is capable of electrically connecting a structure to be welded to a source of welding current.

5. Apparatus according to claim 4, wherein said first connecting means is electrically connected to a first terminal of a source of welding current.

6. Apparatus according to claim 5, wherein said thrust member is electrically connected to a second terminal of said source of welding current.

7. Apparatus according to claim 1, wherein said thrust member is a tubular welding flux damming member surrounding and spaced from said nozzle means.

8. Apparatus according to claim 7, wherein said flux damming member includes supply means for supplying flux to the interior of said flux damming member, said supplying means including an inlet provided in said flux damming member.

9. Apparatus according to claim 7, further comprising suction means for exhausting flux from said flux damming member, said suction means including a conduit in communication with said suction means and said flux damming member, said conduit having an inlet orifice in said flux damming member at a location spaced from the portion of said flux damming member adapted to engage a structure to be welded, said portion of said flux damming member being provided with a plurality of spaced-apart openings sized to admit air into the interior of said flux damming member.

10. Apparatus according to claim 1, wherein said track extends in a generally horizontal direction.

11. Apparatus according to claim 10, wherein said thrust member is movable in a generally vertical direction.

12. Apparatus for submerged-arc spot welding, comprising a track spaced from support means for supporting a structure to be welded; a carriage supported and guided by said track; welding means supported by said carriage; a thrust member supported by said carriage and movable between a first position in which said thrust member engages a structure to be welded and a second position in which said thrust member is spaced a distance from a structure to be welded; motive means for moving said thrust member between said first and second positions, said motive means including a cylinder movable with respect to said carriage towards and away from a structure to be welded and a single piston rod associated with said cylinder, said piston rod being rigidly connected to said thrust member and mounted for reciprocating movement in said cylinder; guiding means for guiding the movement of said cylinder with respect to said carriage; first stop means for limiting the movement of said cylinder towards a structure to be welded; and second stop means rigidly connected to said track and extending along said track for limiting the movement of said cylinder away from a structure to be welded when said thrust member is in said first position, said second stop means abutting said cylinder when said thrust member is in said first position and cooperating with said cylinder and said guiding means to completely immobilize said welding means during a submerged-arc spot welding operation carried out when said thrust member is in said first position.

13. Apparatus according to claim 1 or 12, wherein said cylinder includes carrying means for carrying said guiding means.

14. Apparatus according to claim 13, wherein said carrying means abuts said second stop means when said thrust member is in said first position.

15. Apparatus according to claim 14, wherein said carrying means includes a substantially flat plate rigidly attahed to an end of said cylinder opposite said piston rod.

16. Apparatus according to claim 15, wherein said guiding means includes a pair of projections extending from said plate alongside and parallel to said cylinder and a pair of bores provided in said carriage, each of said bores slideably receiving a corresponding one of said projections.

* * * * *